(12) United States Patent
O'Connor

(10) Patent No.: US 6,962,392 B2
(45) Date of Patent: Nov. 8, 2005

(54) ARTICULATED HEADREST

(76) Inventor: Richard W. O'Connor, 2249 Beach St., Apt. 2, San Francisco, CA (US) 94123

( * ) Notice: Subject to any disclaimer, the term of this patent is extended or adjusted under 35 U.S.C. 154(b) by 0 days.

(21) Appl. No.: 10/206,484

(22) Filed: Jul. 24, 2002

(65) Prior Publication Data
US 2004/0017099 A1 Jan. 29, 2004

(51) Int. Cl.⁷ .............................................. A47C 1/036
(52) U.S. Cl. ......................................... 297/61; 297/408
(58) Field of Search .................................... 297/61, 408

(56) References Cited

U.S. PATENT DOCUMENTS

| | | | |
|---|---|---|---|
| 3,712,666 A | * | 1/1973 | Stoll ............................ 297/61 |
| 3,929,374 A | * | 12/1975 | Hogan et al. ................. 297/61 |
| 4,451,081 A | | 5/1984 | Kowalski |
| 5,378,043 A | | 1/1995 | Viano et al. |
| 5,590,933 A | | 1/1997 | Andersson |
| 5,662,382 A | | 9/1997 | Kerr et al. |
| 5,664,841 A | * | 9/1997 | Dal Monte ................. 297/408 |
| 5,673,971 A | | 10/1997 | Wieclawski |
| 5,772,280 A | | 6/1998 | Massara |
| 5,775,777 A | | 7/1998 | Delling |
| 5,795,019 A | | 8/1998 | Wieclawski |
| 5,816,657 A | | 10/1998 | Hecht et al. |
| 5,823,619 A | * | 10/1998 | Heilig et al. ................. 297/61 |
| 5,906,017 A | | 5/1999 | Ferrand et al. |
| 5,906,414 A | | 5/1999 | Rus |
| 5,964,505 A | | 10/1999 | Koenig et al. |
| 6,012,777 A | | 1/2000 | Wege et al. |
| 6,017,086 A | | 1/2000 | Meyer et al. |
| 6,019,424 A | | 2/2000 | Rückert et al. |
| 6,082,807 A | | 7/2000 | Hartmann et al. |
| 6,082,817 A | | 7/2000 | Müller |
| 6,129,421 A | | 10/2000 | Gilson et al. |
| 6,149,232 A | | 11/2000 | Meyer |
| 6,152,515 A | | 11/2000 | Wieclawski |
| 6,192,565 B1 | | 2/2001 | Tame |
| 6,199,947 B1 | | 3/2001 | Wiklund |
| 6,213,549 B1 | | 4/2001 | Wieclawski |
| 6,213,555 B1 | | 4/2001 | Sulpizio et al. |
| 6,217,117 B1 | | 4/2001 | Weiland |
| 6,270,161 B1 | | 8/2001 | De Filippo |
| 6,273,511 B1 | | 8/2001 | Wieclawski |
| 6,398,291 B1 | | 6/2002 | Reusswig et al. |
| 6,447,068 B1 | | 9/2002 | Anderson et al. |
| 6,485,096 B1 | * | 11/2002 | Azar et al. ................. 297/61 X |
| 6,607,242 B2 | * | 8/2003 | Estrada et al. ........... 297/408 X |

* cited by examiner

Primary Examiner—Anthony D. Barfield
(74) Attorney, Agent, or Firm—Blakely, Sokoloff, Taylor & Zafman LLP

(57) ABSTRACT

An articulated headrest. In one embodiment, an apparatus include a base portion and a headrest portion, and the headrest portion is coupled to the base portion by an articulation mechanism which moves the headrest substantially along an arc defined with respect to a pivot point outside the headrest portion and the base portion. In some embodiments, the pivot point may approximate the cervicothoracic junction of a user. In some embodiments, the headrest portion may be used to maintain the a user's head in a substantially neutral position. In some embodiments, the headrest portion may be deployed in the event of a crash condition and/or may articulate in response to reclining a seat back. In one embodiment, a portable or pillow version may articulate a headrest portion with respect to a base portion to provide head support.

14 Claims, 13 Drawing Sheets

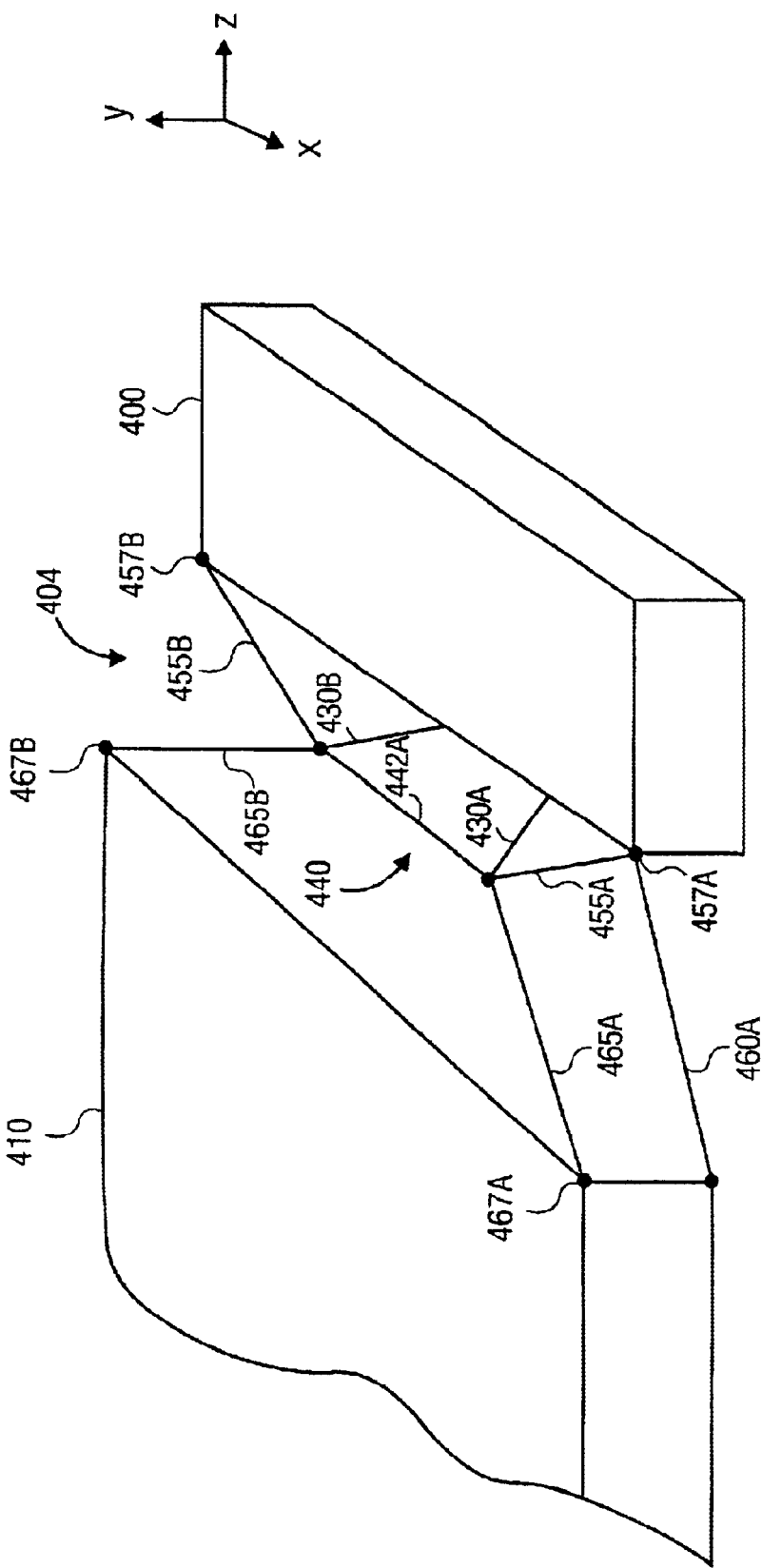

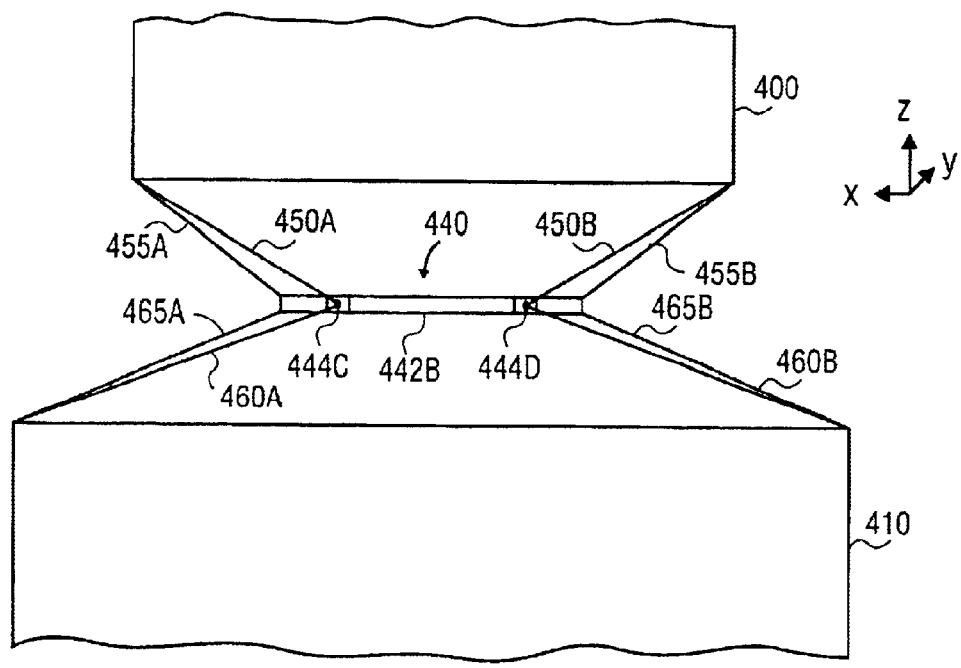
FIG. 4B
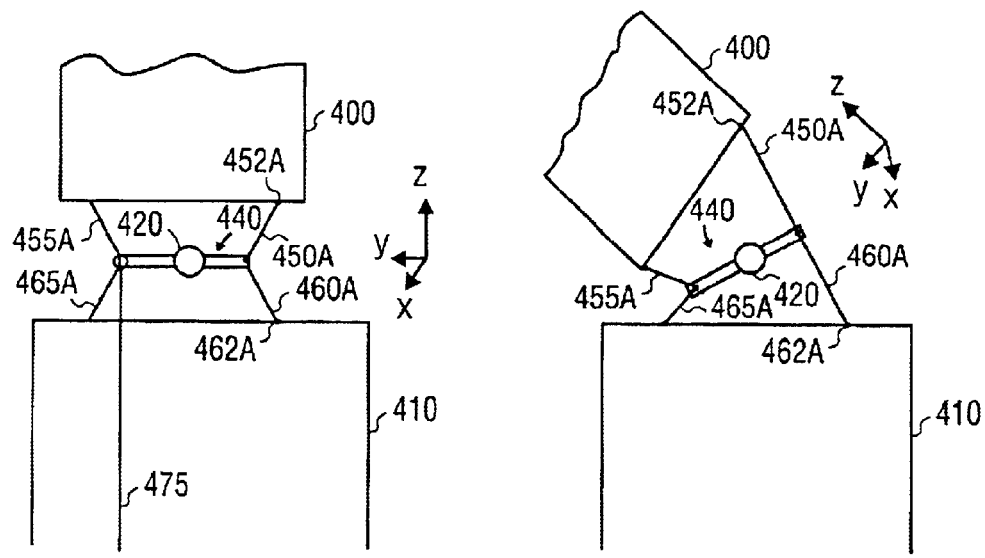
FIG. 4C
FIG. 4D

ARTICULATED HEADREST

BACKGROUND

1. Field

The present disclosure pertains to the field of headrests for seats of various types, including furniture, vehicle seats, and the like as well as for beds or other reclining further or patient care systems.

2. Description of Related Art

Head positioning and support can be crucial to proper ergonomics and to safety. Yet, many current mass-market head support technologies are woefully lacking in either or both of these areas. Therefore, neck pain and stress are commonplace for those who spend extended periods of time sitting, and neck injuries remain a major cause of pain and suffering in vehicle crashes.

Traditional vehicle seats include simple static headrests or headrests that move upwardly and downwardly on stems. Such seats depend partially on users to properly position the headrest for both support and to limit the effect of a crash. Such an approach has limited effectiveness because users often do not properly adjust headrests. Even when properly adjusted, such a traditional headrest may not prevent injury because a passenger's head may gain substantial momentum in a crash before its motion is arrested by the headrest. As a result, whiplash and other head, neck, or back injuries are commonplace. Some newer headrests are larger and/or form an integral portion of the seat. Such headrests may better arrest head acceleration in the event of a crash, but also tend to limit visibility.

Some prior art headrests attempt to improve safety by moving in response to an impact being detected (see, e.g., U.S. Pat. Nos. 6,019,424; 6,082,817; 6,270,161). These various headrests may move upwardly and/or forwardly in response to a crash impact; however, the headrest trajectory or path is limited to a fairly simple and potentially inappropriate path as defined by the particular pivoting and movement mechanism. For example, the headrest typically pivots about a point on the seat back or the seat structure rather than moving in relation to human anatomy.

Some traditional furniture items include headrests that move as well. For example, a reclining lounge (see, e.g., U.S. Pat. No. 4,451,081) or a chaise lounge (see, e.g., U.S. Pat. No. 6,213,555) may include a headrest mechanism that is adjustable to provide additional support. However, once again, the positioning and therefore neck comfort is limited by the particular mechanism that moves the headrest, and these mechanisms typically move relative to the seat structure itself rather than the human anatomy. Since the back, neck, and spine are both complex and sensitive, improved headrest articulation techniques may advantageously lead to improved ergonomics and safety.

BRIEF DESCRIPTION OF THE FIGURES

The present invention is illustrated by way of example and not limitation in the Figures of the accompanying drawings.

FIGS. 4a–4f illustrate an embodiment of a multi-link articulation mechanism.

DETAILED DESCRIPTION

The following description describes embodiments of an articulated headrest and associated methods. In the following description, numerous specific details are set forth in order to provide a more thorough understanding of the present invention. It will be appreciated, however, by one skilled in the art that the invention may be practiced without such specific details.

In some embodiments, headrests are provided that approximate or provide rotation about pivot point that is outside or remote from the headrest portion and base portion to which the headrest is attached. In some embodiments, a headrest sustains a user's head in a neutral or near-neutral head position through range of seat pitches. The neutral or near-neutral position may be obtained by moving the headrest along an arc that is approximately the same as an arc formed by the user's head pivoting about its pivot point in the user's spine. By articulating the headrest along this arc, substantial ergonomic and safety benefits may be realized. In some embodiments, a headrest may be articulated in response to a chair being reclined and/or in response to a vehicle crash.

For the purposes of this disclosure, the term "articulate" is meant to broadly indicate any type of movement. Therefore an articulated headrest is a headrest that is moveable with respect to a base portion. In various embodiments, an articulated headrest may move along different trajectories. Some trajectories may be circular and/or may approximate a head arc defined with respect to a user's anatomy, but other trajectories may be used, depending on the particular application.

Figure 1A:
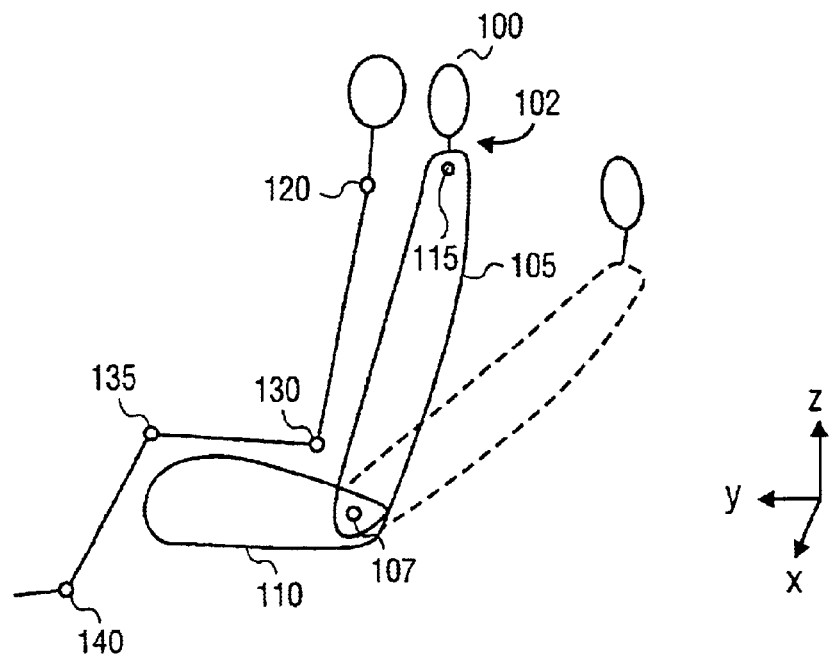
FIGS. 1a and 1b illustrate one embodiment of an articulated headrest.

FIG. 1a illustrates one embodiment of a seat that may employ an articulated headrest according to various disclosed techniques. The seat of FIG. 1a includes a seat base 110 and a seat back 105 which is coupled to the seat base 110 by a pivoting mechanism 107 to allow the seat back to vary in position relative to the seat base 110. In particular, the seat back 105 may be reclined or leaned backward and downward relative to a front face of the seat back 105 which is adapted to engage the body of a person sitting on the seat. The seat includes a headrest 100 which is attached to the seat back 105 at or near an upper seat pivot point 115. For the purposes of this disclosure, as shown in FIG. 1a, the Z direction is defined to be the upward direction with respect to the ground or a seat base if parallel to the ground. The Y direction is defined to be forward from a seat user's perspective and generally perpendicular to the seat back if the seat back is in a fully upright position at a ninety degree angle to the ground, and the X direction is defined to be the lateral direction along a width of the seat.

A user is illustrated sitting on the seat, and various ergonomically significant points in the user's anatomy are illustrated. The user has a foot joint 140, a knee joint 135, a hip joint 130. At these joints, a user is typically afforded a great deal of freedom of movement to obtain a comfortable position. For example, legs may typically, be stretched forwardly to move the knee and foot joints, and various positions of the hip joint may be obtained by adjusting the relative angle between the seat base 110 and the seat back 105. Some seats include specialized pivoting mechanisms for hip joint adjustment to prevent displacement of the seat back 105 with respect to the user's body when the angle between the seat back and the seat base is adjusted. Such a mechanism maintains the relative position of the user's spine with respect to the seat back.

A spinal pivot point 120 is also illustrated in FIG. 1a. In medical terminology, the spine is referred to as having a cervical portion and a thoracic portion which meet at approximately the point labeled 120. The cervical portion is the upper portion including the neck area, and typically contains seven vertebrae, C1 through C7, with C7 being the lowest. Similarly, the thoracic portion begins with a vertebrae numbered T1. Thus, the C7-T1 junction, the cervicothoracic junction, approximates a natural pivot point for a user's head, with the radius of pivot being approximately the length of the user's neck plus one half the diameter of their head. Since the spine is not perfectly straight, each vertebrae allows some degree of flexion, and the head is not perfectly round, nor is its center of gravity located at its geometric center, these are approximations.

A seated person looking forward usually tries to maintain his or her head in a "neutral" or near-neutral position. A neutral position for a person's head is the position at which the person's head is substantially balanced with respect to gravitational forces, such that the head does not tend to fall forward, backward, or to the side. Consider, for example, a person sitting upright at a desk looking at a monitor or a driver of a car who is looking forward at the road. The person's eyes are looking forwardly and relatively horizontally with respect to the ground, and their chin is approximately level. Whether the person reclines their seat, or sits upright, they tend to keep their gaze approximately flat and the head in a neutral position by adjusting the angle of the neck to their back, largely at the C7-T1 junction. The center of gravity of an upright or standing person typically just forward of the atlas (the C1 spine on which the head rests). The neutral position varies with the degree of recline of the person. Positioning a headrest to guide a user's head to the neutral position advantageously reduces the load on their neck muscles and therefore typically leads to greater comfort.

Figure 1B:
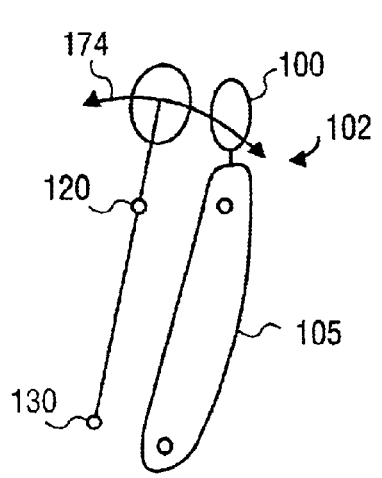

As shown in FIG. 1b, a head arc 174 is formed by the movement of the head about the C7-T1 pivot point 120. In one embodiment, the articulated headrest 100 is articulated to approximate this head arc, which is defined relative to the person sitting in the chair (or to a person of average or specified dimensions). Thus, in one embodiment, the articulated headrest is to move in relation to and with the head of the user as if it pivots about the pivot point 120 and travels through the head arc, or at least along a trajectory designed to provide or maximize intersection of the headrest trajectory and the head arc.

Figure 1C:
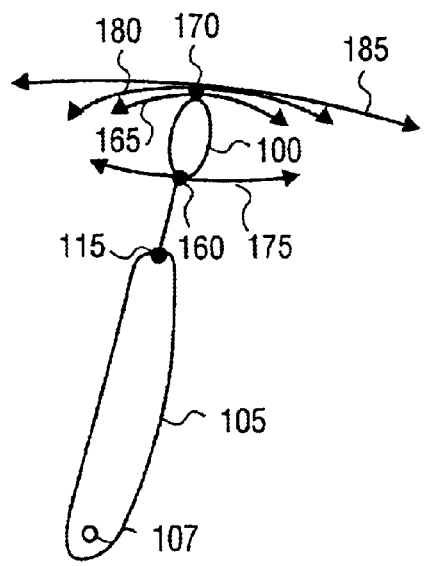
FIG. 1c illustrates various pivot points on a seat according to one embodiment.

Mechanically speaking, however, it is clearly impossible to implement a headrest having a mechanical pivot that is actually physically located in a person's spine. Therefore, the articulation mechanism 102 uses physically available pivot points to approximate or match the effect of having a pivot point located within a user's spine. FIG. 1c illustrates various physically possible choices for pivot points and their respective arcs of rotation. A high pivot 170 at the top of the headrest is one point that could be used for pivoting the headrest. The arc produced using the high pivot 170 is high pivot arc 175. A low pivot 160 may also be used in a fairly straightforward manner, resulting in a low pivot arc 165. Alternatively, the upper seat pivot 115 could be used to pivot the headrest along a seat pivot arc 180. The headrest also pivots along an arc 185 in response to rotation of the seat back about the hip pivot 107. These arcs based on easily implemented pivot points, however, do not track the head's natural neutral position based on the spinal pivot point 120. Various other pivot points in or near the seat, seat back, or headrest may also be used.

The arc followed by the articulated headrest may be a function of the geometries of the seat and the seat user. At each degree of recline, one point on the head arc will approximate the neutral position for the user's head, and it may be desirable to position the headrest to support the user's head in approximately the neutral position. Assumptions may be made as to the size, etc. of a typical or average user. Another consideration is whether the cervicothoracic pivot will be located in a fixed location with respect to the headrest mechanism. There are also two basic types of chairs which may be dealt with separately in determining the articulation of the headrest.

A first type of chair maintains the user in a fixed position with respect to the seat back (referred to as a fixed back position chair). In a fixed back position chair, either the seat back is in a fixed position with respect to the seat base, or the hinging mechanism between the seat base and the seat back provides more than a simple mechanical hinge, but rather allows an adjustable distance between the seat back and the seat base such that the user's back remains in a substantially fixed position with respect to the seat back. For a fixed back position chair, the trajectory of the articulated headrest may be described by a second order equation in one embodiment (i.e., it is a circular path).

The second kind of chair (a non-fixed back position chair) provides a hinging mechanism between the seat base and one or more potions of the seat back but does not compensate for the motion to prevent relative back-to-seat back motion. The non-fixed back position chair causes the user to slide along the seat back when the seat back is reclined because the axis of rotation of the seat back differs from that of the user (the user's hip joint). In the case of the non-fixed back position chair, the position of the user's spinal pivot point with respect to the chair varies, further complicating the task of maintaining the headrest substantially coincident with the articulated headrest arc as previously discussed.

For a non-fixed back position chair, the equation describing the trajectory is further complicated by the movement of the seat back to the user's back. In one example, a third order equation can be used to describe the proper trajectory. By properly designing an articulation mechanism to follow the proper trajectory, a proper neutral position may be achieved.

Other types of seats may also use an articulated headrest. Seats may take many forms and shapes and may be segmented into a number of different pieces or may outwardly appear as one piece but may include inner segments. Similarly, a "headrest" or a headrest portion may be a separate portion of a seat which is adapted to engage a head or it may be a portion of the seat, pillow, or the like which engages a person's head. Headrests may be of a great variety of sizes, shapes and styles.

In some embodiments, the headrest 100 is articulated along the head/headrest arc in response to reclining the seat back 105. In other embodiments, the headrest may additionally or alternatively be deployed forwardly and upwardly along the head/headrest arc in response to a crash. Moreover, the headrest may include an additional pivot mechanism to maintain the front surface of the headrest approximately normal to the user's head. Additionally, the seat shown in FIG. 1a, or another multiple-joint seat, may be positionable to support the user in the supine position, with the user's head being maintained in approximately a neutral position by the articulated headrest.

Figure 2A:
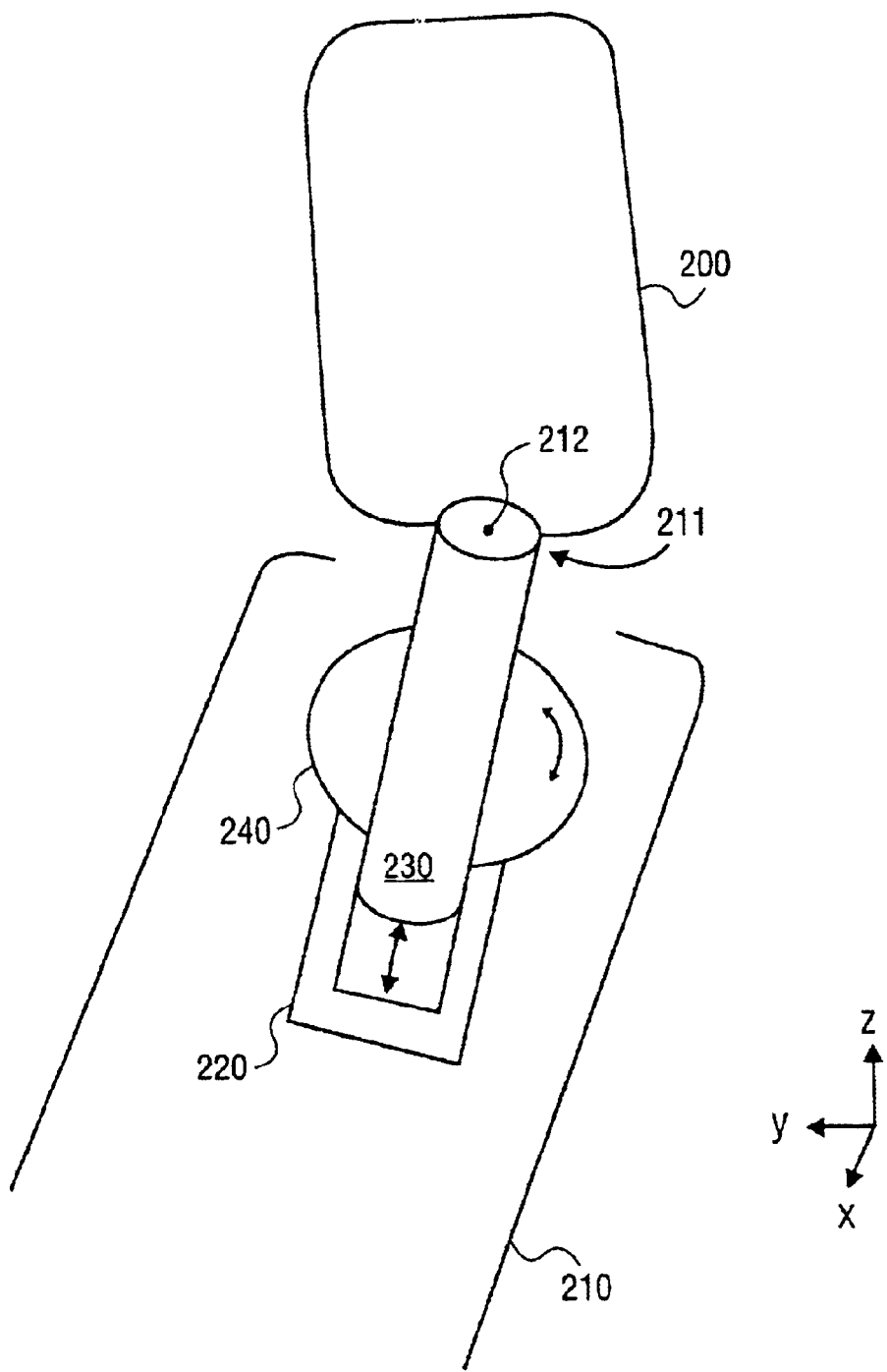
FIG. 2a illustrates one embodiment of a seat using a headrest articulation mechanism that extends and/or rotates a headrest stem member.

FIG. 2a illustrates one embodiment of an articulating headrest utilizing an extending and/or rotating mechanism. In one embodiment, tilting of the seat back causes actuation of the headrest, but in other embodiments, the user may manually move the headrest or may move the headrest using a motorized assist. In the embodiment of FIG. 2a, a headrest 200 is attached to a seat back 210 by a stem member 230 extending upwardly from the seat back 210. A cylinder 220 receives the stem member 230 and moves the headrest inward and downward toward the seat back 210 and outward and upward away from the seat back 210. A rotation mechanism 240 rotates the stem member 230 and cylinder 220 relative to the seat back 210. Two or more stem members may be used in some embodiments, but one stem member is shown in FIG. 2a. Each stem member may be a cylindrical or otherwise shaped member and may in some cases be hollow.

The embodiment of FIG. 2a also may include an additional pivot mechanism 211 to pivot the headrest 200 about a pivot point 212. The additional pivot mechanism includes a frame with respect to which the head-engaging portion of the headrest pivots about the pivot point. The additional pivot mechanism pivots the head-engaging portion to maintain the headrest 200 in an approximately normal (tangential) relationship to the user's head. The additional pivot mechanism may also be actuated by reclining of the seat back 210.

To obtain a trajectory approximately equal to the head arc based on a person's spine, the rotation mechanism rotates forwardly moving the headrest forward as the seat back moves backwardly or into a further reclined position. The stem member 230 is pushed outwardly extending the headrest upwardly also as the seat back moves backwardly or into the further reclined position. Similarly, the stem member 230 is drawn into the cylinder 220 and the rotation mechanism 240 rotates backwardly (clockwise as shown in FIG. 2a) as the seat back is moved to a more upright position. Thus, both radial and angular displacement is achieved as the seat back reclines (as well as when the seat back is move to a more upright position).

Figure 2B:
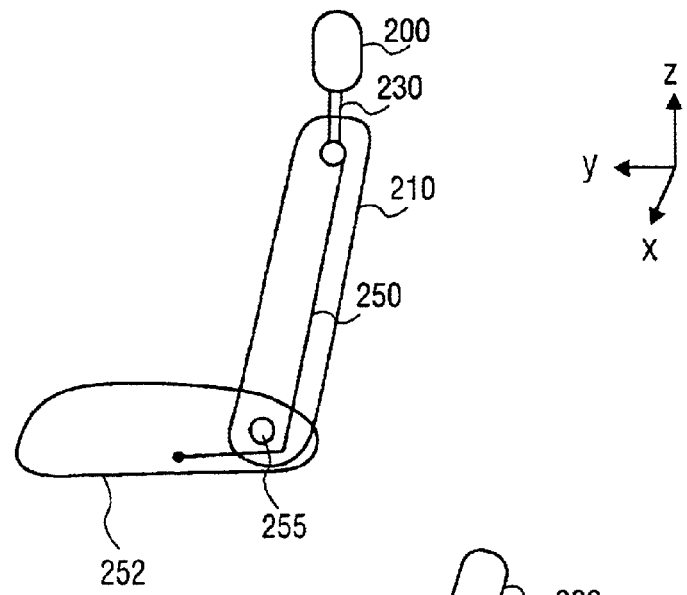
FIG. 2b illustrates one embodiment of a seat having an articulated headrest actuated via a linkage mechanism.

The cylinder 220/stem member 230 combination and the rotation mechanism 240 may be mechanically actuated in response to reclining of the seat back. In one embodiment, shown in FIG. 2b, a linkage 250 links to a hinge 255 and/or a seat base 252. When the seat back is reclined, the linkage 250 transfers this motion to the cylinder/stem member and rotation mechanisms to mechanically articulate the headrest. Additionally or instead of such mechanical actuation, motorized assist may be provided. Various mechanical, hydraulic, or pneumatic mechanisms may be used to power the articulation. For example, techniques used to move and/or adjust seats and/or powered beds may be used. In one embodiment, the articulated headrest may just be rotated by the rotation mechanism (without the stem member extending outwardly) in response to reclining the seat back.

Figure 2C:
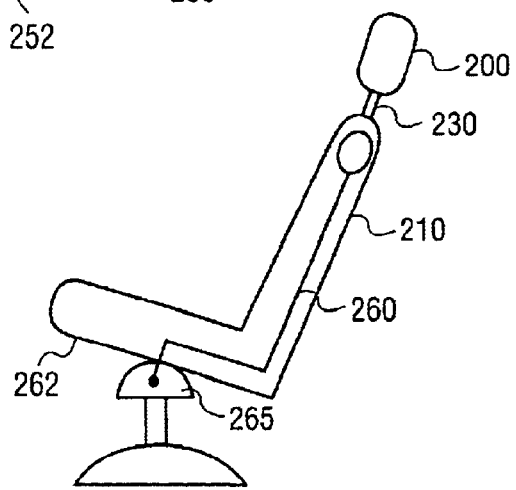
FIG. 2c illustrates another embodiment of a seat having an articulated headrest actuated via a linkage mechanism.

As shown in FIG. 2c, the seat may be a seat with a fixed relationship between the seat base 262 and the seat back 210. A pivot 265 may allow both the seat base 262 and the seat back 210 to recline. A linkage 260 transfers this motion to the cylinder/stem member and rotation mechanisms to mechanically articulate the headrest.

Figure 2D:
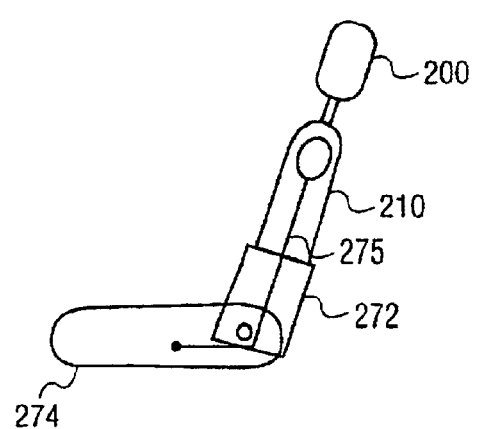
FIG. 2d illustrates a multiple segment seat having an articulated headrest and a linking mechanism to articulate the headrest based on the position of the multiple segment seat.

Another embodiment is shown in FIG. 2d. In the embodiment of FIG. 2d, the seat back 210 is linked to a second seat back portion 272, which in turn is pivotally connected to a seat base 274. The seat back 210 may telescope in to the second seat back portion 272 to increase or decrease the overall height of the seatback. The seat back 210 may also be pivotally adjustable with respect to the seat base 274 and the second seat back portion 272. A linkage mechanism 275 may be used to indicate the angular displacement of the various seat portions.

In some embodiments, multiple linkage mechanisms may be used to reflect multiple relative position changes in seats that are adjustable in two or more respects. Additionally, some embodiments may electronically actuate the linkage or may provide a computerized linkage function by having a computer process the various seat angles and positions and actuate the headrest component into the proper position via electronic motors. Some embodiments may include smart seat technology that remembers, after user positioning and storage, proper seat adjustments, or that detects or approximates proper adjustments for a particular user.

The angle of displacement of the rotation mechanism (•) and the radius to which the stem member is extended (R) may be a function of the geometries of the seat and the seat user as previously discussed with respect to determining the articulated headrest arc to be followed. The proper mechanical ratios may be implemented in a variety of mechanical or electronic means as are known to those of skill in the art.

Figure 3:
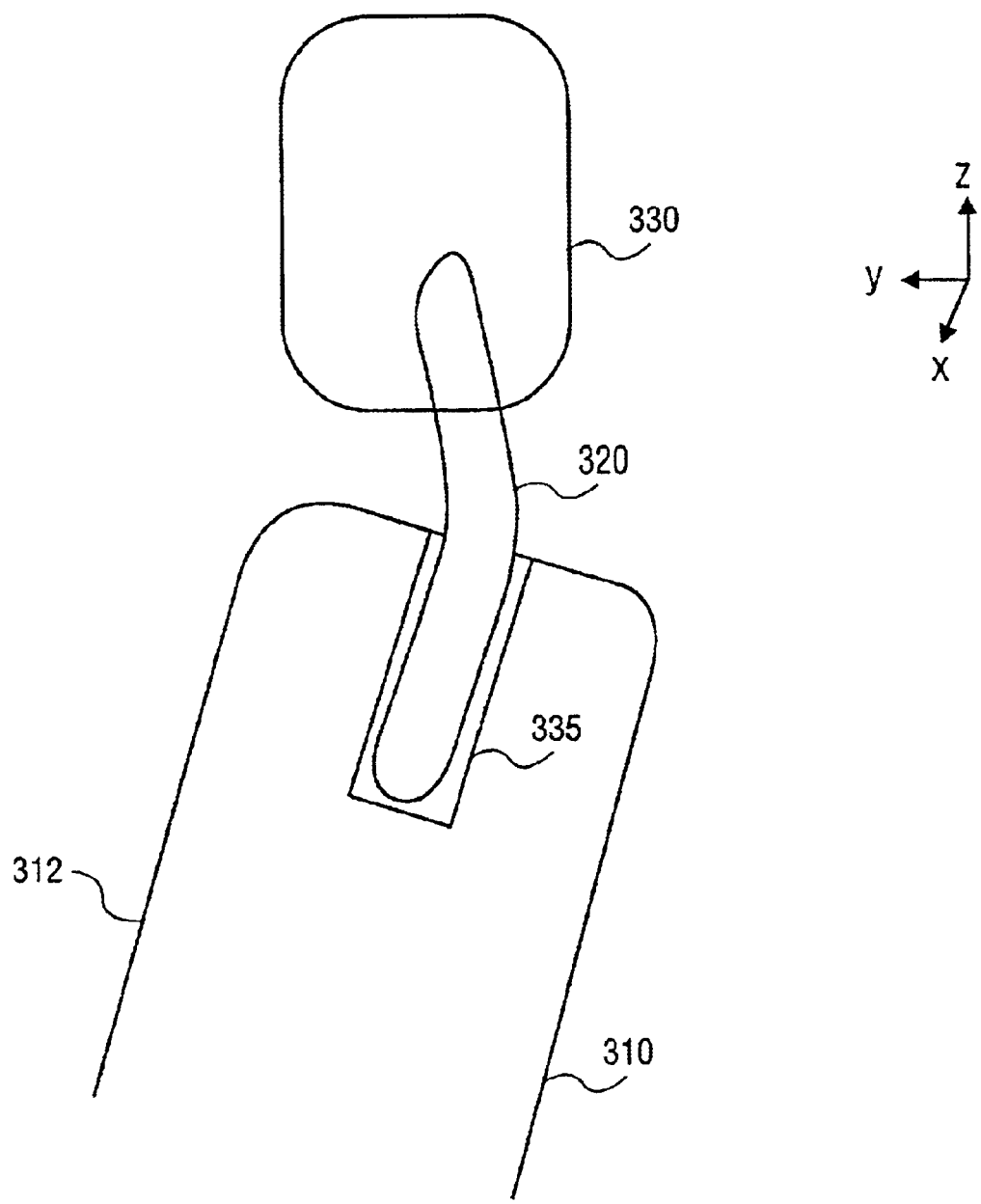
FIG. 3 illustrates an embodiment of a slidable articulation mechanism.

FIG. 3 illustrates another embodiment of an articulated headrest. The headrest of FIG. 3 is moved along a head arc trajectory by use of a curved stem member or curved stem members that extend into the seat back. Again, for simplicity, only one stem member is shown, but it will be appreciated by one of skill in the art that one, two, or another number of stem members may be used to support the headrest. In the embodiment of FIG. 3a, a headrest 330 is attached to a stem member 320. The stem member 320 is inserted into a cavity 335 in the seat back 310. The stem member 320 is pushed upwardly as the seat back 310 is reclined, resulting in the headrest moving upwardly (i.e., in the Z direction) and forwardly (i.e., in the Y direction) with respect to the front 312 of the seat back 310 in response to the seat back being reclined. Similarly, the headrest 330 is moved downwardly and backwardly with respect to the front 312 of the seat back 310 in response to the seat back being positioned in a more upright position. A linkage mechanism (as previously described with respect to FIGS. 2b–2d) may be used to actuate the headrest movement in response to user input or, user motion/reclining.

The stem member 320 may be mounted to allow rotation along its longitudinal axis so that the stem member may be turned to better fit within the dimensions of the seat back 310. Such rotation allows the curved stem members to be stowed flush with the plane of the seat back. A larger degree of curvature in the stem member generally causes greater stowing difficulty the smaller the radius of the curve of the stem member (i.e., the sharper the curve in the stem member). The overall shape of the curved stem member is defined by the articulated headrest arc which may be designed to approximate the head arc of a user as previously discussed.

In an alternative embodiment, one or two curved stem members may be used and the headrest may slide along the curved stem members. In this embodiment, the headrest may be moved along the curved stem members to the proper position along the articulated headrest arc. The curved stem members may also rotate along their axes to facilitate the proper positioning of the headrest and/or to allow a more compact design. Again, a linkage may be used to articulate the headrest in response to adjustment of the seat back angle.

FIGS. 4a–4e illustrate another embodiment of an articulated headrest. The embodiment of FIGS. 4a–4e utilizes a multi-link mechanism to provide the angular gain used to provide the appropriate articulated headrest arc. As shown in the perspective view of FIG. 4a, this embodiment includes a seat back 410 to which a lower portion (located at a location corresponding to a lower value along the Z axis) of the articulation mechanism 404 is attached, and a headrest 400 to which an upper portion of the articulation mechanism 404 is attached. The articulation mechanism 404 includes a floating frame 440 which is suspended by link members between the headrest 400 and the seat back 410. Two lower frontal link members 465a and 465b attach respectively corner points 444a and 444b of the floating frame 440 to attachment points 467a and 467b of the seat back 410. Thus, viewed from the front (looking straight down the Y axis), the top portion of the seat back or seat back frame, the link members 465a and 465b, and the frontal member 442a of the frame 440 form a trapezoid (see FIG. 4b), with the seat-back-attached bottom portion being the larger of the two parallel sides.

Similarly, two rear lower link members 460a and 460b attach respectively corner points 444c and 444d of the floating frame 440 to attachment points 462a and 462b (not shown but located in a location symmetric to 462a on the opposite side of the seat back along the X axis) of the seat back 410 (see the back side view of FIG. 4b). Also, two upper frontal link members 455a and 455b attach respectively corner points 444a and 444b to attachment points 457a and 457b of the headrest 400, and two upper rear link members 450a and 450b attach respectively corner points 444c and 444d of the floating frame 440 to rear attachment points 452a and 452b (not shown but located in a location symmetric to 452a on the opposite side of the seat back along the X axis) of the headrest 400.

With respect to a center point of the frame 440, the seat back attachment points are positioned outwardly toward the corners of the seat back 410 from their respective frame corner points. In some embodiments, the seat back attachment points may be located radially outward from the center of the frame 440 and in other embodiments the seat back attachment points may be spaced outwardly from their respective floating frame attachment points along or perpendicular to respectively a frontal member 442a or a rear member 442b of the frame 440. While the corner attach points on the seat back 410 and headrest 400 may be coincident or near coincident with the corner points of respectively the top surface of the seat back frame and the bottom surface of the headrest frame, this depends on the geometry of the seat back and the headrest, and a great variety of connection options will be apparent to those of skill in the art. In some embodiments, the articulation mechanism 404 may attach to points well within the corners of the top surface of the seat back 410. In some embodiments, these surfaces may not be flat and other geometries may be formed by the overall mechanism.

Figure 4E:
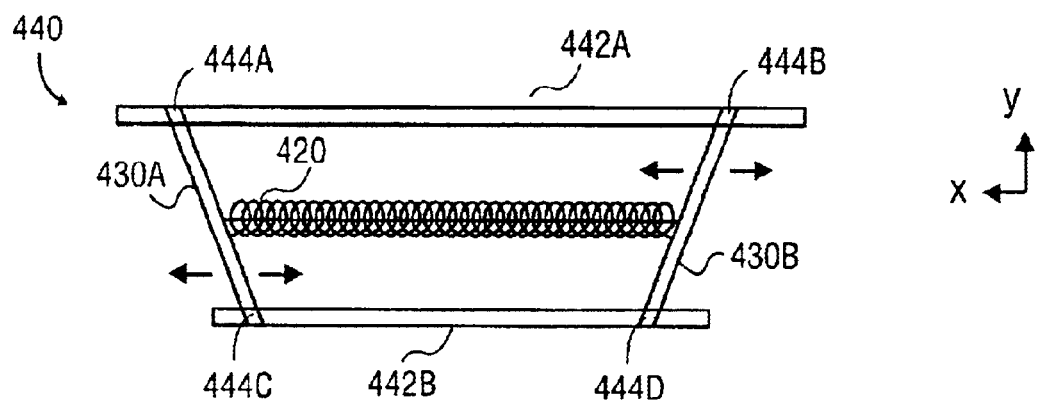

In the illustrated embodiment, the frame 440 includes a biasing mechanism 420 and has an overall trapezoidal shape (see, e.g., the top view of the frame 440 in FIG. 4e). The outer frame members 430a and 430b are biased by the biasing mechanism 420 (e.g., a spring), but are slidable along the front and rear frame axes defined by frontal member 442a and rear member 442b. The length of the rear link members 450a and 450b and 460a and 460b are greater than the respective lengths of the front link members 455a and 455b and 465a and 465b. In one embodiment, the four front link members are of a first length L1, and the rear link members are of a second longer length L2. The longer length of the rear link members provides angular gain as the headrest is pivoted forwardly (in the Y direction) and upwardly (in the Z direction). As shown in FIGS. 4c and 4d, the headrest pivots and can be moved forwardly as the seat is reclined to provide articulation along an arc that in some embodiments maintains a user's head in a neutral or near neutral position. This and other articulation mechanisms can also be adjustable by the user and/or used to provide a different position, such as a safety position or a crash impact position in which the headrest is rotated forwardly to arrest head acceleration.

In one embodiment, the various linkage members and frame are metallic to provide strength, rigidity and durability. For example, these properties may be useful in an automotive application, in which the articulation mechanism may be subject to great stress in the event of a crash which causes a passenger's head to forcefully impact the headrest. In other applications or also in automotive applications, other appropriate materials may be used. One of skill in the art will appreciate that an appropriate articulation mechanism may be produced using a variety of materials, including a mixture of different types of materials and components. For example, plastic or brass bushings may be used for durability of friction bearing components and/or pivot points. Moreover, metallic or reinforced plastics may be used for various linkages, link members and frames.

As with other embodiments, the multi-link articulation mechanism may be actuated by reclining the seat and/or seat back 410. For example, a linkage 475 may be provided to attach to the frame 440 (see, e.g., FIG. 4c) or to other portions of the articulation mechanism 404 or headrest 400 from the seat back 410. The linkage 475 may link the headrest articulation to cause adjustments in a variety of manners. The linkage 475 may be connected to another portion of the seat (e.g., a second lower seat back portion, a seat base portion, a seat pedestal portion, etc.) such that when the user's relative degree of recline changes, the linkage 475 may be actuated. The linkage 475 may also be coupled to a motor which is actuated by the user to adjust the headrest position, either independently of or in addition to any effect caused by reclining the seat. The headrest position may be adjusted under motor assist or according to a computerized control system in some embodiments.

Figure 4F:
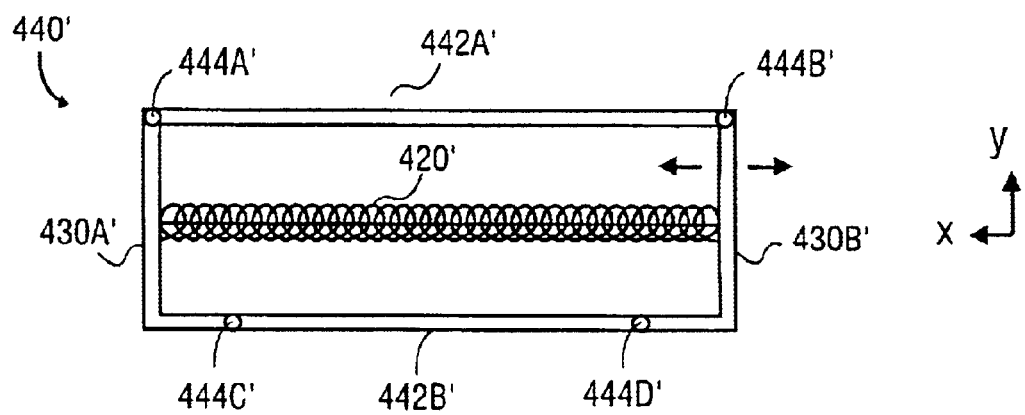

One embodiment of an alternative inner frame is shown in FIG. 4f. In the embodiment of FIG. 4f, a rectangular inner frame 440' is used. The rectangular frame includes opposite sides, respectively frontal member 442a' and rear member 442b'. Outer frame members 430a' and 430b' are biased by a biasing mechanism 420', but are slidable along the front and rear frame members 442a' and 442b'. In this case, the outer frame members 430a' and 430b' are L shaped, including a bend, such that they extend respectively from pivot points 444a' to 444c' and 444b' to 444d'. Link members may connect the pivot points 444a', 444b', 444c' and 444d' to a seat back and headrest in the various manners previously described.

The activation force required to articulate an articulated headrest may vary depending on its position, and may vary in a non-linear fashion. For example, at points closer to the fully stowed position where the seat back is approximately parallel to the Z axis, different forces may be required to articulate the headrest than when the seat back is reclined and/or if the headrest is deployed forwardly and upwardly in the event of a crash. Moreover, the headrest may be tend to be more structurally rigid in various positions (e.g., deployed forwardly and upwardly) than others (e.g., upright). Such variation in forces and rigidity may be compensated to some extent by design choices, and may persist to varying degrees in various embodiments. For example, nautilus cams or other various lever mechanisms may be used to provide non-linear linkage mechanisms that deliver sufficient force to move the headrest the appropriate position-dependent amount.

Figure 5A:
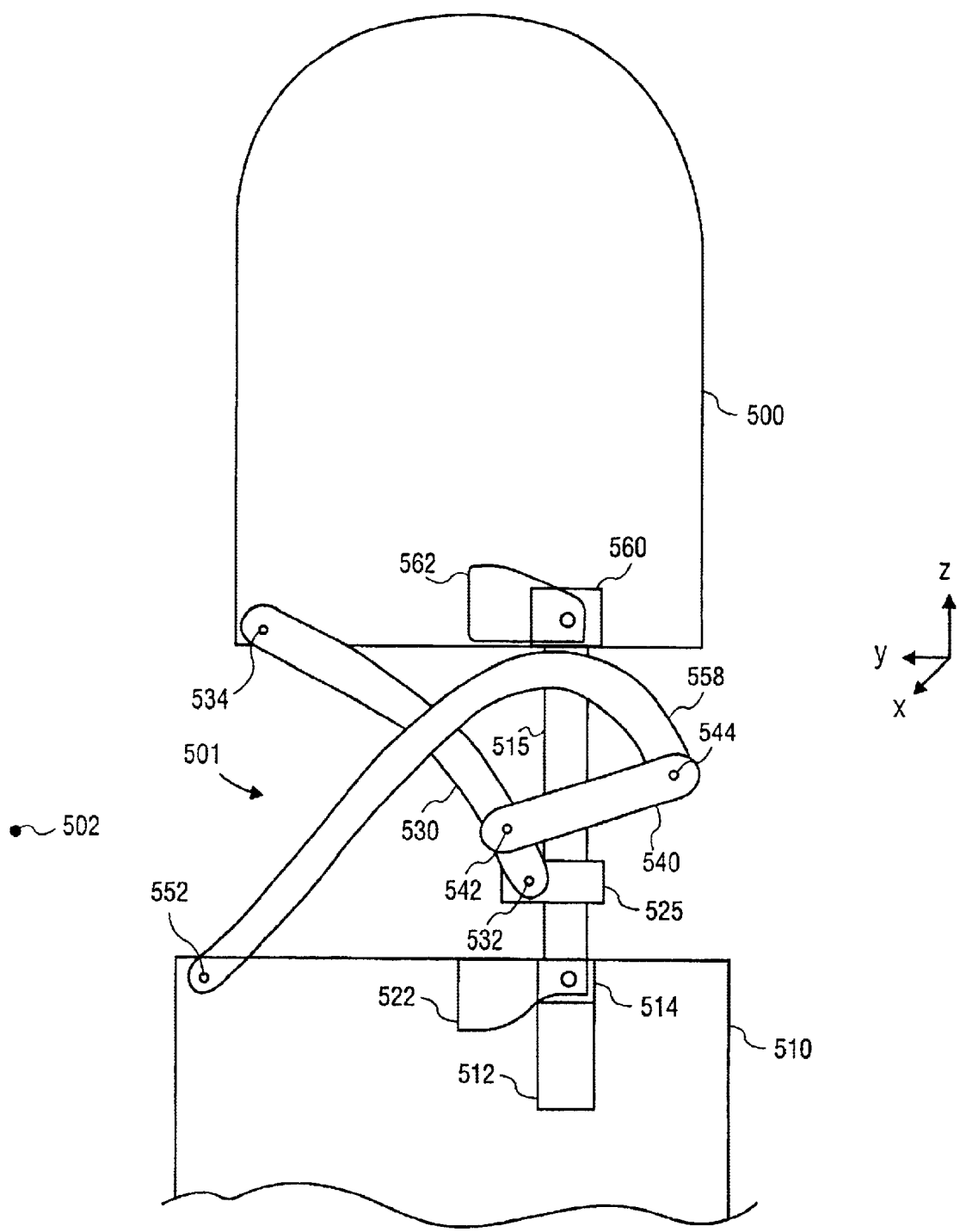
FIGS. 5a–5c illustrate an embodiment of another articulation mechanism.
Figure 5B:
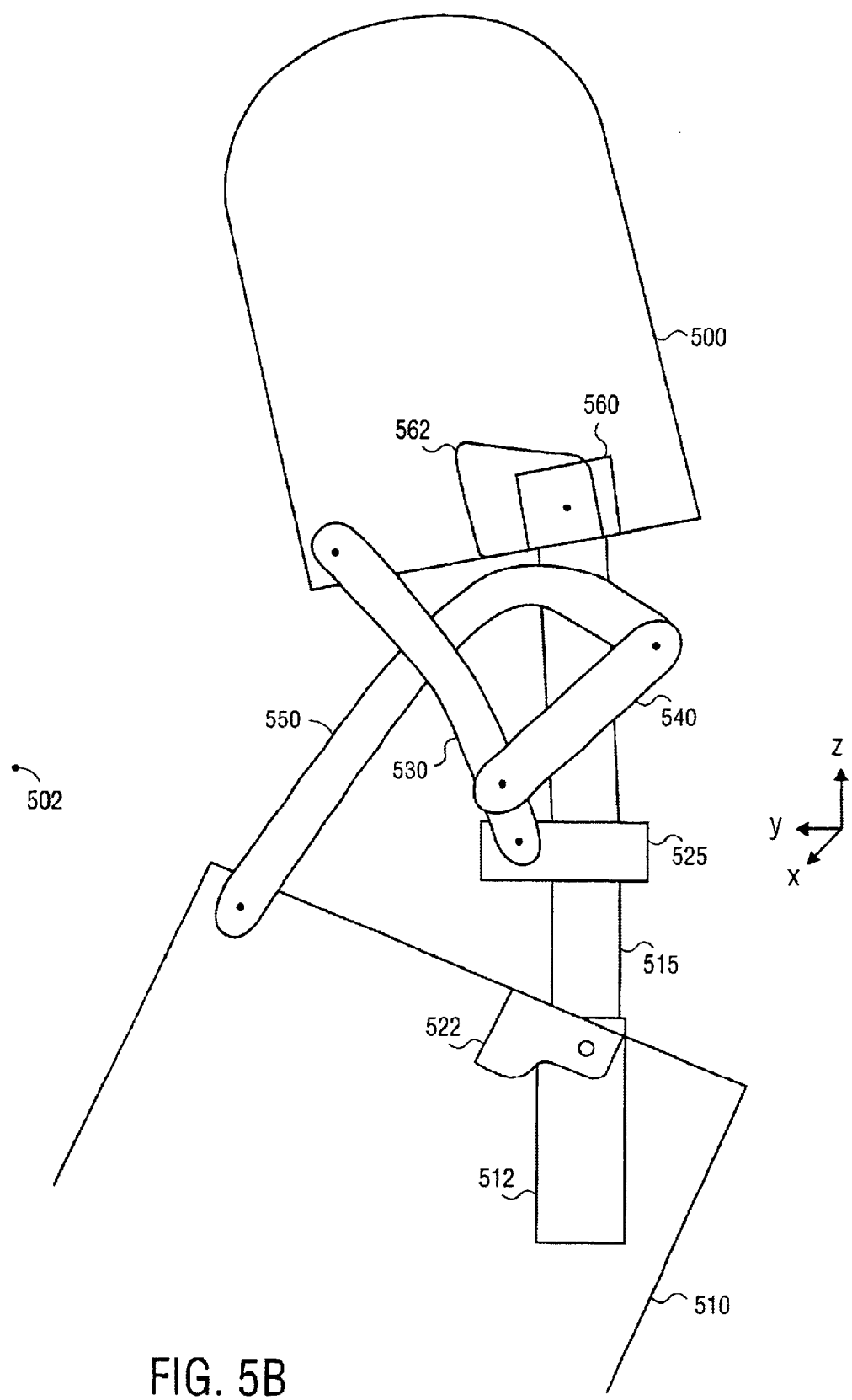
Figure 5C:
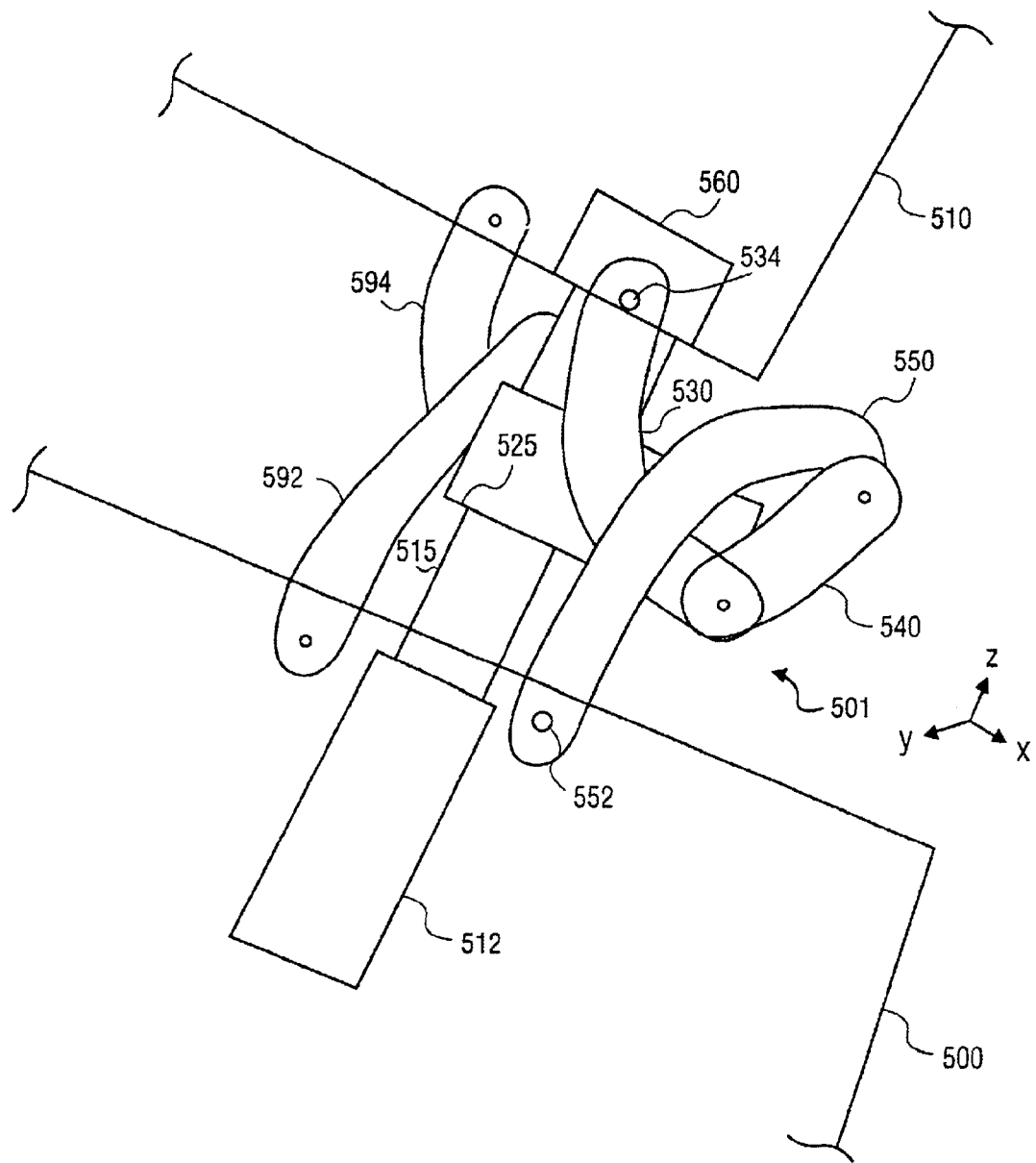

FIGS. 5a–5c illustrate another embodiment of an articulated headrest. In this embodiment, a variable length rod assembly and a separation varying hinge assembly provide headrest movement approximating a head arc for a user. That is, the headrest movement is designed to approximate the user's natural head pivot approximately about the cervicothoracic junction. As shown in FIG. 5a, a headrest portion 500 is attached to a seat back 510 by a variable length rod 515 and a hinging mechanism 501. The variable length rod 515 extends at a first end from a drive cylinder 512 which extends the rod 515 and retracts the rod 515 as the headrest and seat back 510 are moved with respect to each other (the overall assembly length varies, and the rod may be of fixed length or telescoping). A support member 522 and block 514 may be used to affix the rod and/or cylinder 512 to the seat back frame. A second end of the rod 515 is attached to the headrest via a block 560 and a support member 562. The support members 522 and 562 allow pivotal motion of the rod 515 with respect to the seat back and the headrest. The hinge mechanism is referred to as separation-varying because unlike a traditional hinge in which the two hinged members remain separated by a substantially fixed distance, the separation varying hinge mechanism articulates the headrest and base further away from and closer to each other due to the remote pivot point.

A base member 525 (base portion) is attached to the rod 515. A link arm 530 is attached to the base member 525 at a pivot point 532. The link arm 530 is also attached to the headrest 500 at a pivot point 534. A second link arm 540 is pivotally attached to the link arm 530 at a pivot point 542. A third link arm 550 is pivotally attached to the ink arm 540 at a pivot point 544, and attached to the seat back 510 at a pivot point 552.

FIG. 5b illustrates the seat back 510 in a reclined position and the headrest 500 pivoted forward along the approximated head arc provided by the articulation mechanism in this embodiment. As can be seen from FIG. 5b, as the rod 515 is extended, the base member 525 moves with the rod 515 and the three link members 530, 540, and 550 respectively hinge about their pivots to approximate rotation about a pivot point 502 that approximates a user's cervicothoracic junction. In another embodiment, the base member 525 may be slidably attached to the rod 515.

FIG. 5c illustrates a perspective view of a separation varying hinge according to one embodiment. In FIG. 5c, only one hinge mechanism is shown, but it is to be understood that either one hinge may be used to attach the headrest to the seat back, or multiple hinges may be used in some applications. In the embodiment of FIG. 5c, the hinge mechanism is shown as having two sides. The first side includes link members 530, 540 and 550 as previously shown in the side views of FIGS. 5a and 5b. Additionally, a second set of analogous link members may be used on the other side of the rod 515 to provide stability to the hinge. As illustrated, a link member 594 is connected to the headrest, and a link member 592 is connected to the seat back 500, and another link member (not shown) connects link members 592 and 594 as link member 540 connects link members 530 and 550. The base member 525 may be pivotally connected to 594 and the unseen link member as the base member 525 is connected to the link members 530 and 540. This embodiment may advantageously allow the link members (e.g., 530, 540, 550, etc.) to be produced economically using stamped sheet metal.

Alternatively, a geared or other mechanism may be used to provide the appropriate rotation and spacing between the headrest and seat back while rotation the headrest approximately along an arc of a pivot point beyond the frame of the headrest. Additionally, other linkages and geometric arrangements may be used to provide a similar effect, that of rotating or approximating rotation about a remote pivot point.

Figure 6:
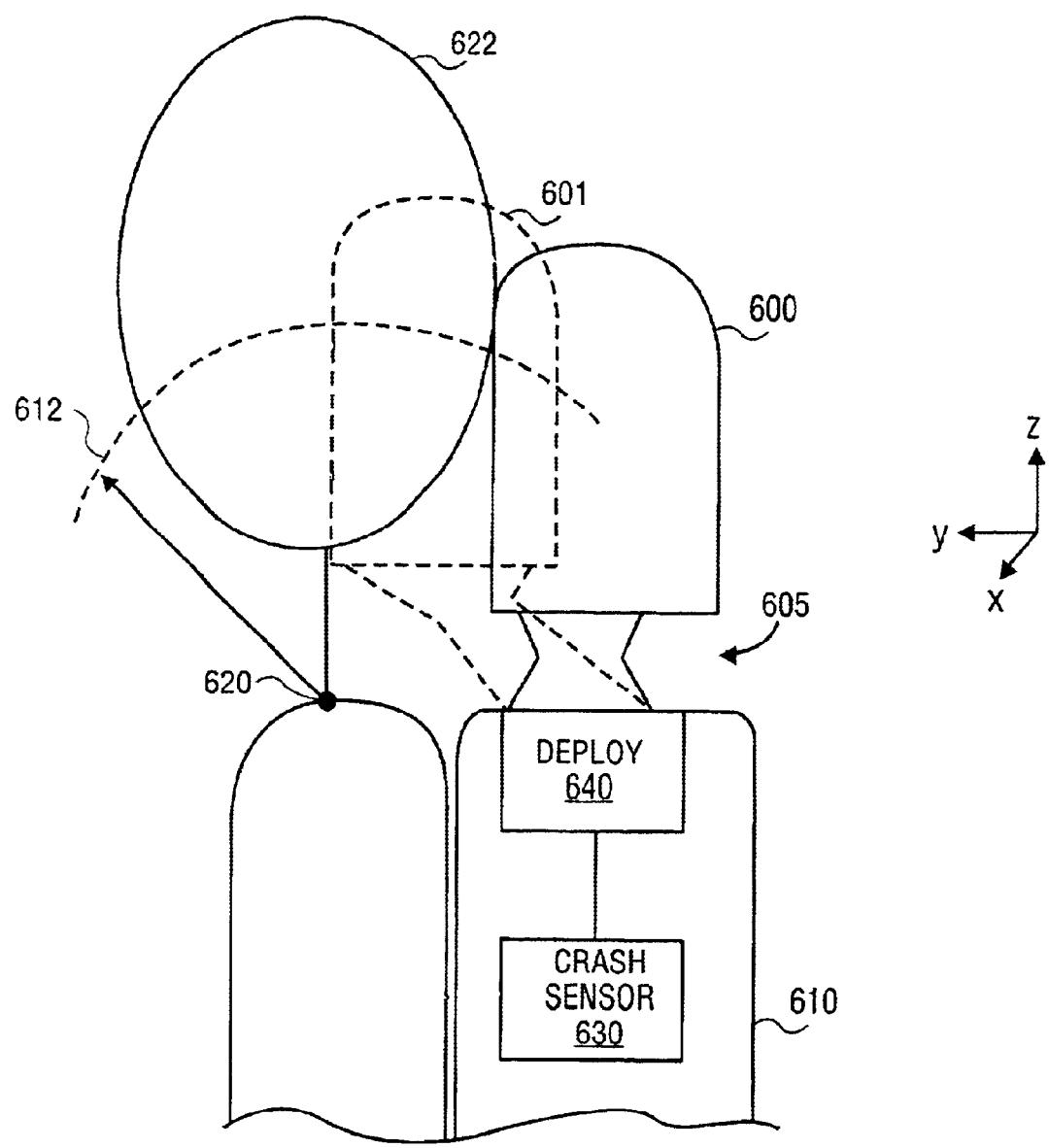
FIG. 6 illustrates one embodiment of a crash deployed articulated headrest.

FIG. 6 illustrates one embodiment of a crash-deployed articulated headrest. This embodiment includes a headrest 600 which is attached to a seat back 610 by an articulation mechanism 605. A variety of different articulation mechanisms may be employed, including, but not limited to those previously described. The headrest 600 may articulate to keep a head 622 of a user in a position along a head arc 612 defined by the cervicothoracic junction 620 of the user.

It may be generally desirable to limit the amount of motion of a person's head in the event of a vehicular crash. In the event of a head-on crash, a person usually recoils (due to an air bag or seat belt) and impacts the seat and headrest. The rearward momentum can cause severe neck and back damage, whiplash, etc., when the person's spine pivots and the rearward head movement is not arrested. For example, if a traditional headrest is not extended upwardly to the proper position, and a person's lower neck impacts the headrest, the lower neck becomes the pivot point, and the head continues to rotate backwardly. Having a headrest in the proper position to arrest the backward movement of the head may eliminate or reduce injuries.

Similarly, in a rear-end crash situation, the person's head is immediately jolted backwards. If the headrest is positioned too low and does not arrest the motion of the head, then severe injury may result. In the case of a rear end crash, the time to adjust headrest position in response to the crash is even less than in the head-on crash situation.

The headrest 600 may be maintained in a variety of user positions in normal use. The headrest may articulate responsive to reclining the seat back or may simply be positionable either manually or electronically by the user. The headrest 600, however, also deploys forwardly when a crash is detected. Thus, the headrest 600 is also shown (in dashed lines) in a forward or deployed position 601. A deployment mechanism 640 operates responsive to a crash sensor 630 to deploy the articulated headrest forwardly along the head/headrest arc 612. The deployment mechanism may be an electronic or pyrotechnic mechanism that is triggered by the crash sensor 630 to deploy the headrest forwardly. Various techniques that are presently used to deploy airbags and other vehicular safety mechanisms may be used to move the articulated headrest.

Similarly, the crash sensor 630 may use known technologies to detect when a crash occurs (or more accurately to detect conditions that appear to indicate that a crash has occurred), as done for airbags and other vehicular safety restraints. For example, a force sensor may sense the change of inertia occurring due to sudden deceleration in a crash. Impact or other sensors may also be used. The crash sensor 630 may or may not be located in a portion of the seat or near the seat depending on the choice of technology to detect when a crash occurs.

In some embodiments, the crash sensor 630 may be particularly selective about when to deploy the headrest 600 to the forward position 601. In the event of a crash, the headrest 600 will typically need to be deployed forwardly in a rapid and perhaps forceful manner in order to be properly positioned in time to reduce the backward motion of the head that typically causes whiplash and other problems. Since a rapid deployment is needed and the head may be impacted in an erroneous deployment, extra certainty that a particular type of accident has occurred may be appropriate. Thus, in one embodiment, front and rear end collisions of greater than a selected threshold of intensity trigger the deployment mechanism 640. Additionally, the direction of impact may be considered to avoid moving the headrest forwardly in the event of a side impact.

Figure 7A:
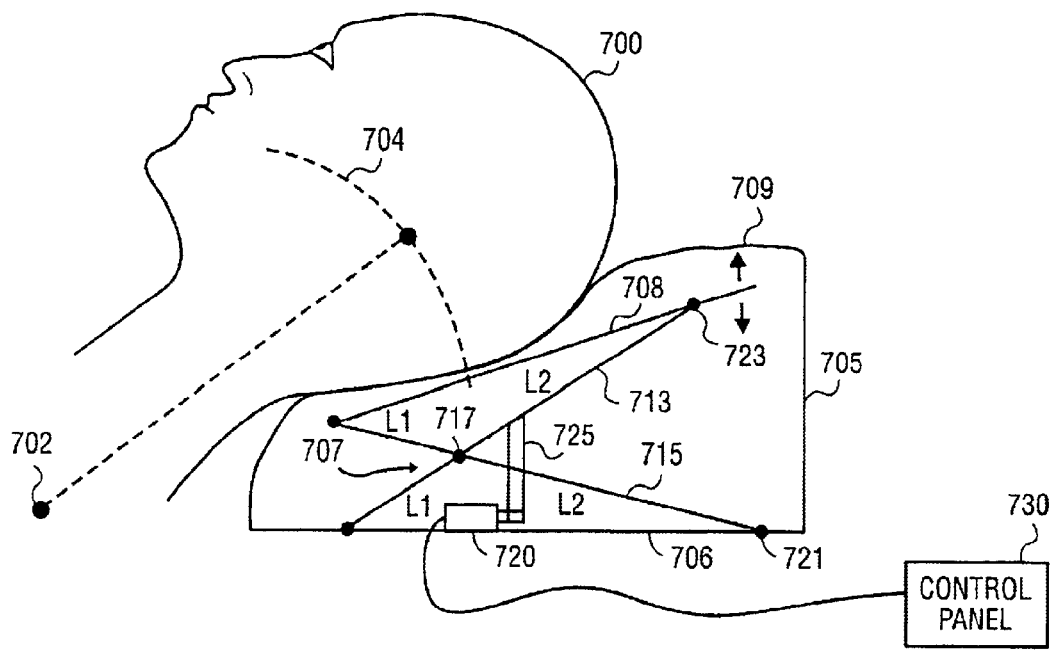
FIG. 7a illustrates one embodiment of a portable or self-contained articulated headrest unit.

FIG. 7 illustrates another embodiment of an articulated headrest 705. The embodiment of FIG. 7 may be a portable or stand-alone headrest usable with various human support devices such as a bed or other reclining furniture or medical apparatus, or may be integrated with a reclining furniture or medical device such as a hospital bed. The headrest includes an articulated portion 708 to support a head 700 of a user. The articulated portion 708 is covered by padding 709 and may be articulated along a head arc 704 defined by cervicothoracic junction 702 of a head 700 of a user.

The articulated portion 708 attaches to a base portion 706 and is articulated upwardly by a scissors mechanism 707 or another articulation mechanism. For example, a torsion hinge parallelogram mechanism may be used to provide articulation of the articulated portion. Alternatively, a variable geometry trapezoidal mechanism may also be used. In some embodiments, the portable or stand-alone version may not articulate along the head arc, but rather may just articulate upwardly and/or forwardly along a different trajectory, and may cause some skin shear. The scissors mechanism 707 has a first scissors member 713 pivotally attached to a second scissors mechanism 715. In one embodiment, a ratio of lengths of the front portion of each scissors mechanism to the back portion of each scissor member may be used to provide the angular gain to provide proper headrest articulation. For example, as shown in FIG. 7, forward portions of the scissors members 713 and 715 in front of the pivot point 717 may be of a length L1 and back portions of a length L2. The ratio of L1 to L2 defines the trajectory of the articulated portion 708. In some embodiments, attach points 721 and 723 may be slidable with respect to respectively the base portion 706 and the articulated portion 708 to provide forwardly motion (in the Y direction) as well as upwardly motion (in the Z direction).

In some embodiments, the headrest may be manually adjustable; however, in the embodiment shown, a motor 720 actuates the scissors mechanism 707 to electronically adjust the headrest position. A linkage 725 attaches the motor 720 to the scissors mechanism 707 to provide electronically assisted articulation, of the upper portion of the headrest that engages the user's head. A variety of pneumatic, hydraulic and/or various mechanical solutions may be used. For example, the types of mechanisms used to electronically adjust current car seats or hospital beds, mechanized chairs, or the like may be appropriate for various applications.

A control panel 730 allows the user or other person (e.g., hospital staff) to adjust the position of the user's head. If the headrest articulates about the user's cervicothoracic junction 702 as its pivot point, the motion of the user's head does not need to move the position of the head along the padding 709. Therefore, the padding and/or the user's hair do not bunch up or cause frictional rubbing. Such a headrest may be particularly useful in a hospital environment where it is desirable to move patients' heads without causing other discomfort. Additionally, such an articulated headrest pillow also provides a more comfortable head adjustment for able-bodied users.

Figure 7B:
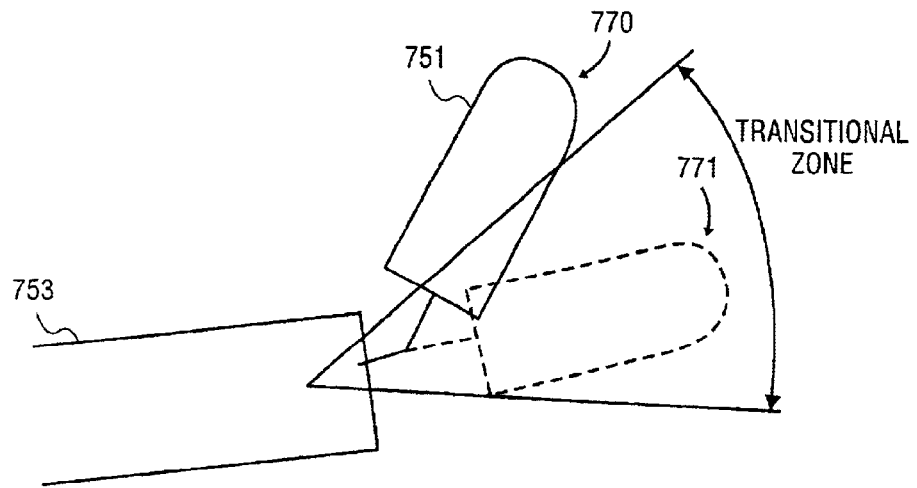
FIG. 7b illustrates one embodiment of an articulated headrest having a transition zone release.

Often, when a user reaches a certain degree of recline (a transition zone), the user desires rest and no longer desires to maintain a neutral position. Therefore, as shown in FIG. 7b, in one embodiment the articulated headrest offers a transitional zone, in which the user can elect to place the headrest in a flat position, or at least closer to flat position than the neutral position, in order to lay back and rest. Thus, the headrest 751 may have a first position 770 with respect to the seat back 753 or a second position 771. A separate control may be used in mechanized embodiments to move the headrest into a flat position via an adjustment button that causes the headrest to move to a flat position. In one embodiment, adjusting to flat may be available from an angle of recline of the seat back of approximately forty five degrees from the Z axis or more. The flat position may be flat or aligned with respect to the seat back, with respect to horizontal, or may in fact be some other non-neutral position or position off the headrest arc trajectory. Such a transitional positioning may be advantageous in both bed-type and seat-type applications.

Figure 8A:
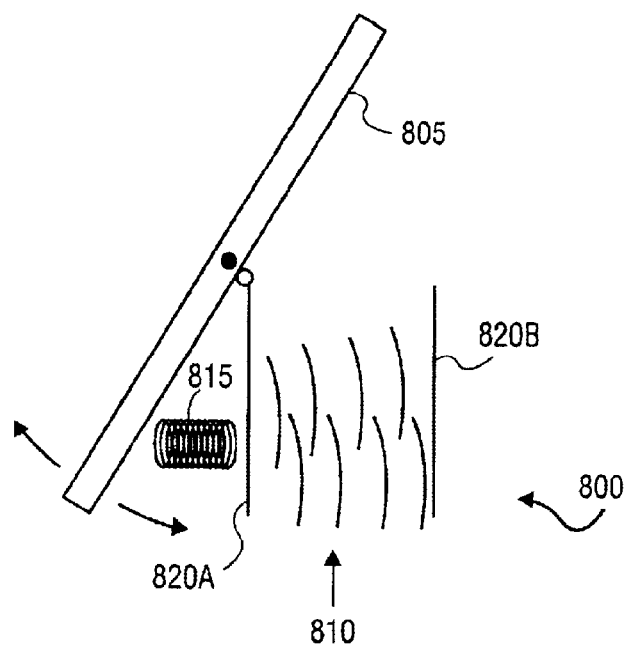
FIGS. 8a–8b illustrate one embodiment of an independent adjustment mechanism.

Compensating for varying sizes of users is one challenge in developing a headrest that approximates an arc defined by the user's anatomy. Various embodiments of articulated headrests may include independent adjustment mechanisms of various types to compensate for user's sizes and/or particular preferred positions. For example, an independent adjustment mechanism including a release lever and a forward biasing mechanism may be used in one embodiment. One example of an independent adjustment mechanism 800 is shown in FIG. 8a. A release lever 805 may prevent one or more springs 815 (e.g., there may be springs one both sides of plates) from pressing together interleaved plates 810 that form a brake holding the headrest in place. For example, the plates may be steel or another metal or other material which when pressed together. form a frictional coupling to hold member 820a in place with respect to member 820b. When the release lever 805 is in the release position (as shown), then members 820a and 820b can move with respect to each other relatively freely.

Figure 8B:
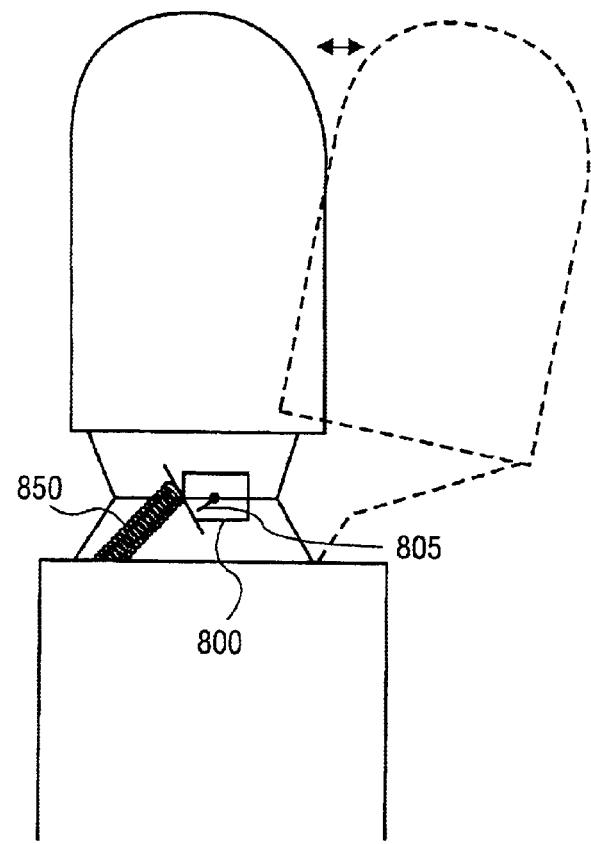

When a user wishes to adjust the headrest, the user may pull the release lever. A biasing mechanism 850 (e.g., a spring) shown in FIG. 8b biases the headrest forwardly, with the headrest articulating forwardly as previously described on one of variety of articulation mechanisms. The user may then push the headrest backwardly with their head against the force of the biasing mechanism 850 and release the release lever to brake the headrest in its current position.

Another way in which the varying sizes of users may be compensated is by various other seat adjustments. For example, the telescoping seat back of FIG. 2d may help compensate for the height of the torso of a user. Additionally, different persons may have very different spine curvature. An extreme case is a person whose neck is bent significantly forwardly. Another extreme case is a person whose upper spine is relatively flat or straight. Variations between different spines may be compensated by adjusting the pivot point of the head/headrest arc. In many applications, the pivot point will fall approximately three to seven inches in front of the seat back/headrest in the upright position. By moving the pivot point via adjustable articulation mechanisms, various different sizes of persons and shapes of spines may be accommodated. Additionally, by providing a horizontal sliding mechanism that slides the headrest forwardly or backwardly (when the seat back is upright), spine curvature may be accommodated.

An articulated headrest may be deployed in a great variety of applications. Various furniture items may provide improved ergonomics by using an articulated headrest, such as office chairs, particularly high end office chairs, chairs designed to be used with adjustable-position liquid crystal display monitors on a pivot arm, recliner chairs, lounge chairs. Additionally, many types of vehicular seats may benefit from an articulated headrest, either or both in terms of safety and ergonomics. For example, car seats, train seats, airplane seats, truck seats, coach seats, etc., may all employ articulated headrests. Moreover, patient care systems, hospital beds, other beds, couches, and other reclining items may also employ articulated headrest technology.

While certain embodiments have been described to have certain features (such as mechanical actuation, electrical control, motorized assist, crash deployment, articulation in response to reclining, independent adjustment, etc.), these various features may be used with any articulation mechanism as may be appropriate for a particular application. Also, while certain articulation mechanisms have been disclosed it is to be understood that various other articulation mechanisms may be within the spirit and scope of various embodiments of the invention. Other embodiments mechanisms may be used to articulate a headrest along an arc that substantially coincides with a head arc and/or which maintains a neutral position. Moreover, other embodiments may seek to limit, reduce, or minimize deviation from such an arc by approximating the arc, in some cases through a particular range of motion.

Additionally, while various articulation mechanisms have been described, it should also be noted that it may be desirable to cover such mechanisms for aesthetic or practical reasons. For example, a user's hair might otherwise get caught in some articulation mechanisms. Thus, a plastic, cloth, leather, or other casing may be employed in some embodiments to cover and/or mask the articulation mechanism. In some embodiments, the articulation mechanism may be cloaked within a unified covering for a seat which extends from the seat back portion over the headrest, providing a unified look for the seat and headrest. In other embodiments, a flexible casing may just extend between the headrest and the seatback. In yet other embodiments, the articulation mechanism may remain exposed. In some embodiments, the base portion to which the headrest is attached may be a traditional seat back or a portion of a segmented seat. In other embodiments, the base portion may be other types or parts of seating, sleeping or other furniture items to which an articulation mechanism may be attached to articulate a headrest portion for user comfort, safety, or other reasons.

Thus, an articulated headrest and associated methods is disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. An apparatus comprising:
   a head support portion;
   a base portion comprising a seat back portion pivotable between a generally upright position and a reclined position, said seat back portion having a front side adapted to engage a user;
   an articulation mechanism coupling said head support portion to said seat back portion, said articulation mechanism to move said head support portion relative to said seat back portion approximately along an arc defined with respect to a pivot point which is entirely forward of said front side of said seat back portion in said upright position, said articulation mechanism to move said head support portion from a first head support portion position to a second head support position, wherein the head support portion is spaced away from the seat back portion in the second head support position, wherein said articulation mechanism is to position the head support portion approximately along the arc in a position to maintain a user's head in a substantially neutral position, and wherein said articulation mechanism is to articulate said head support portion to a new neutral position in response to reclining the seat back portion.

2. The apparatus of claim 1 wherein the pivot point is outside a volume defined to include all of the head support portion and the base portion and is a remote pivot point that lies entirely outside of the head support portion, the base portion and all mechanisms coupling the head support portion to the base portion.

3. The apparatus of claim 1 wherein said articulation mechanism is to move said head support portion approximately along an arc defined by a point approximating a cervicothoracic junction of a user and a radius approximating a user's neck length.

4. The apparatus of claim 1 said articulation mechanism comprises:
   a first stem member extending upwardly from said seat back portion to support said head support portion and attach said head support portion to said seat back portion, said head support portion being coupled to an upper end of the first stem member;
   a stem member actuation mechanism to extend said stem member upwardly and outwardly to move said entire head support portion away from said seat back portion while rotating the stem member forwardly.

5. The apparatus of claim 4 wherein the stem member actuation mechanism is to extend said stem member upwardly and outwardly from said seat back while rotating the upper end of the stem member forwardly about a longitudinal axis point of the stem member to move said entire head support portion forwardly in response to reclining of the seat back portion.

6. An apparatus comprising:
   a base portion comprising a seat back portion;
   a headrest portion;

means for articulating said headrest portion to pivot said headrest portion relative to said seat back portion about a pivot point entirely outside of a volume including both the headrest portion and the base portion and outside any mechanism of the apparatus, the means for articulating also moving said headrest portion to an articulated forward position providing a gap between the seat back portion and the headrest portion, wherein said means for articulating is responsive to movement of said seat back portion.

7. The apparatus of claim 6 wherein said means for articulating is to position said headrest portion along an arc at a substantially neutral point for a user's head.

8. The apparatus of claim 6 wherein said headrest portion is coupled to said seat back portion by a stem, and wherein said means for articulating said headrest portion comprises:
   a headrest extension mechanism to extend said entire headrest portion outwardly with respect to said seat back portion by moving said stem;
   a headrest rotation mechanism coupled to rotate said stem to which the headrest portion is coupled to move said entire headrest portion forwardly.

9. The apparatus of claim 8 further comprising a headrest pivot, said headrest pivot pivotally coupling said headrest portion to said stem.

10. An apparatus comprising:
    a seat portion comprising a seat back portion and a seat base portion, said seat back portion having a front side adapted to engage a user and being pivotable to a generally upright position and a reclined position;
    an articulated headrest portion;
    an articulation mechanism mechanically coupling the articulated headrest portion to the seat back portion, said articulation mechanism to pivot said articulated headrest portion with respect to the seat back portion about a pivot point that is a remote pivot point that lies entirely outside of the seat portion, the articulated headrest portion and all mechanisms movably coupling the articulated headrest portion to the seat portion and is entirely forward of a plane of said seat back portion in said generally upright position, said articulated headrest portion being articulated to a forward position providing a spacing between said seat back portion and said articulated headrest portion in response to reclining the seat back portion relative to said seat base portion.

11. The apparatus of claim 10 wherein said articulation mechanism is to move said articulated headrest portion approximately along an arc defined by a point approximating a cervicothoracic junction of a user and a radius approximating a user's neck length.

12. The apparatus of claim 10 wherein said articulated headrest portion is supported on and attached to said seat back portion by a stem that extends into said seat back portion, wherein said articulation mechanism comprises:
    a headrest extension mechanism to extend said entire articulated headrest portion away from said seat back portion by extending a portion of said stem out from said seat back portion in response to reclining said seat back portion from said generally upright position to said reclined position;
    a headrest rotation mechanism coupled to rotate said stem and the articulated headrest portion about a longitudinal axis of the stem and to move the entire articulated headrest portion forwardly with respect to the front side of the seat back portion in response to reclining said seat back portion from said generally upright position to said reclined position.

13. The apparatus of claim 12 further comprising a pivot mechanism to pivotally couple the headrest portion to the stem, said pivot mechanism being actuated by reclining of the seat back portion.

14. An apparatus comprising:
    a base portion comprising a seat back portion;
    a headrest portion coupled to said seat back portion by a stem that extends into said seat back portion;
    a headrest pivot, said headrest pivot pivotally coupling said headrest portion to said stem;
    means for articulating said headrest portion to pivot said headrest portion relative to said seat back portion about a pivot point entirely outside of a volume including both the headrest portion and the base portion and outside any mechanism of the apparatus, the means for articulating also moving said headrest portion to an articulated forward position providing a gap between the seat back portion and the headrest portion, said means for articulating said headrest portion comprising:
    a headrest extension mechanism to extend said entire headrest portion outwardly with respect to said seat back portion by moving said stem;
    a headrest rotation mechanism coupled to rotate said stem to which the headrest portion is coupled to move said entire headrest portion forwardly.

* * * * *